(12) United States Patent
Aonuma

(10) Patent No.: US 8,471,864 B2
(45) Date of Patent: Jun. 25, 2013

(54) IMAGE PROCESSOR AND IMAGE PROCESSING METHOD EMPLOYING A DITHER PATTERN HAVING SUB-DITHER PATTERNS

(75) Inventor: Koki Aonuma, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1071 days.

(21) Appl. No.: 12/051,477

(22) Filed: Mar. 19, 2008

(65) Prior Publication Data

US 2008/0239394 A1 Oct. 2, 2008

(30) Foreign Application Priority Data

Mar. 30, 2007 (JP) ................................ 2007-093585

(51) Int. Cl.
| G09G 5/00 | (2006.01) |
| G09G 5/02 | (2006.01) |
| G06F 13/00 | (2006.01) |
| G06F 15/00 | (2006.01) |
| G06K 15/00 | (2006.01) |
| G06K 9/38 | (2006.01) |
| G06K 9/40 | (2006.01) |
| G06K 9/36 | (2006.01) |
| G06K 9/60 | (2006.01) |
| H04N 1/46 | (2006.01) |

(52) U.S. Cl.
USPC ........... 345/596; 345/581; 345/600; 345/606; 345/536; 345/644; 358/1.9; 358/3.13; 358/524; 358/525; 382/172; 382/254; 382/274; 382/276; 382/305

(58) Field of Classification Search
USPC ............... 345/596, 616, 63, 72, 89, 581, 589, 345/600–602, 606, 612, 618–619, 643, 644, 345/645, 536–538, 547–548, 555, 204, 690; 358/1.1, 1.9, 3.01, 3.13, 3.23, 3.24, 3.27, 358/500, 509, 523–525, 534–535; 382/168–169, 382/172, 237, 254, 266–267, 269, 274, 276, 382/282, 300, 305, 318
See application file for complete search history.

(56) References Cited

U.S. PATENT DOCUMENTS

| 6,836,346 | B2 * | 12/2004 | Yoshizawa et al. ............ 358/1.9 |
| 7,599,099 | B2 * | 10/2009 | Tamaru ....................... 358/3.28 |
| 2003/0058482 | A1 * | 3/2003 | Morimatsu ................... 358/457 |
| 2007/0092151 | A1 * | 4/2007 | Takahashi et al. ............ 382/251 |
| 2007/0171247 | A1 * | 7/2007 | Kitagawa ........................ 347/15 |
| 2012/0019876 | A1 * | 1/2012 | Murray ......................... 358/474 |

* cited by examiner

FOREIGN PATENT DOCUMENTS

| JP | 6-164909 | 6/1994 |
| JP | 2001-86336 | 3/2001 |
| JP | 2002-125122 | 4/2002 |

*Primary Examiner* — Wesner Sajous
(74) *Attorney, Agent, or Firm* — Scully, Scott, Murphy & Presser, P.C.

(57) ABSTRACT

An image processor includes a first dither data memory storing a first dither matrix, a second dither data memory storing a second dither matrix, a selecting unit selecting one of the first dither matrix and the second dither matrix, and a converting unit converting multi-value image data to binary data by comparing density of the multi-value image data to the threshold value set in corresponding element of the one of the first dither matrix and the second dither matrix selected by the selecting unit. The second dither matrix is configured of a plurality of sub-dither matrices. Each sub-dither matrix has a plurality of elements each assigned with a threshold value in a range from a maximum threshold value to a minimum threshold value. A set of threshold values from the minimum threshold value to a predetermined intermediate threshold value is assigned to elements in corresponding locations of each of the plurality of sub-dither matrices.

14 Claims, 6 Drawing Sheets

FIG.2

| | Na1 | | Na2 | | | Nc1 | | | | | | | |
|---|---|---|---|---|---|---|---|---|---|---|---|---|---|
NA
| 41 | 33 | 65 | 97 | 197 | 181 | 149 | 221 | 43 | 35 | 67 | 99 | 199 | 183 | 151 | 223 |
| 25 | 1 | 9 | 81 | 141 | 229 | 245 | 173 | 27 | 3 | 11 | 83 | 143 | 231 | 247 | 175 |
| 57 | 17 | 49 | 113 | 165 | 237 | 253 | 133 | 59 | 19 | 51 | 115 | 167 | 239 | 255 | 135 |
| 89 | 73 | 105 | 121 | 213 | 157 | 189 | 205 | 91 | 75 | 107 | 123 | 215 | 159 | 191 | 207 |
| 193 | 177 | 145 | 217 | 45 | 37 | 69 | 101 | 195 | 179 | 147 | 219 | 47 | 39 | 71 | 103 |
| 137 | 225 | 241 | 169 | 29 | 5 | 13 | 85 | 139 | 227 | 243 | 171 | 31 | 7 | 15 | 87 |
| 161 | 233 | 249 | 129 | 61 | 21 | 53 | 117 | 163 | 235 | 251 | 131 | 63 | 23 | 55 | 119 |
| 209 | 153 | 185 | 201 | 93 | 77 | 109 | 125 | 211 | 155 | 187 | 203 | 95 | 79 | 111 | 127 |
| 44 | 36 | 68 | 100 | 200 | 184 | 152 | 224 | 42 | 34 | 66 | 98 | 198 | 182 | 150 | 222 |
| 28 | 4 | 12 | 84 | 144 | 232 | 248 | 176 | 26 | 2 | 10 | 82 | 142 | 230 | 246 | 174 |
| 60 | 20 | 52 | 116 | 168 | 240 | 256 | 136 | 58 | 18 | 50 | 114 | 166 | 238 | 254 | 134 |
| 92 | 76 | 108 | 124 | 216 | 160 | 192 | 208 | 90 | 74 | 106 | 122 | 214 | 158 | 190 | 206 |
| 196 | 180 | 148 | 220 | 48 | 40 | 72 | 104 | 194 | 178 | 146 | 218 | 46 | 38 | 70 | 102 |
| 140 | 228 | 244 | 172 | 32 | 8 | 16 | 88 | 138 | 226 | 242 | 170 | 30 | 6 | 14 | 86 |
| 164 | 236 | 252 | 132 | 64 | 24 | 56 | 120 | 162 | 234 | 250 | 130 | 62 | 22 | 54 | 118 |
| 212 | 156 | 188 | 204 | 96 | 80 | 112 | 128 | 210 | 154 | 186 | 202 | 94 | 78 | 110 | 126 |

FIG.3

| | $a_1$ | | | | $a_2$ | | | $c_1$ | | | | | | |
|---|---|---|---|---|---|---|---|---|---|---|---|---|---|---|
| 41 | 36 | 65 | 97 | 197 | 181 | 149 | 221 | 43 | 36 | 67 | 99 | 199 | 183 | 151 | 223 |
| 28 | 4 | 12 | 81 | 141 | 229 | 245 | 173 | 28 | 4 | 12 | 83 | 143 | 231 | 247 | 175 |
| 57 | 20 | 49 | 113 | 165 | 237 | 253 | 133 | 59 | 20 | 51 | 115 | 167 | 239 | 255 | 135 |
| 89 | 73 | 105 | 121 | 213 | 157 | 189 | 205 | 91 | 75 | 107 | 123 | 215 | 159 | 191 | 207 |
| 193 | 177 | 145 | 217 | 45 | 40 | 69 | 101 | 195 | 179 | 147 | 219 | 47 | 40 | 71 | 103 |
| 137 | 225 | 241 | 169 | 32 | 8 | 16 | 85 | 139 | 227 | 243 | 171 | 32 | 8 | 16 | 87 |
| 161 | 233 | 249 | 129 | 61 | 24 | 53 | 117 | 163 | 235 | 251 | 131 | 63 | 24 | 55 | 119 |
| 209 | 153 | 185 | 201 | 93 | 77 | 109 | 125 | 211 | 155 | 187 | 203 | 95 | 79 | 111 | 127 |
| 44 | 36 | 68 | 100 | 200 | 184 | 152 | 224 | 42 | 36 | 66 | 98 | 198 | 182 | 150 | 222 |
| 28 | 4 | 12 | 84 | 144 | 232 | 248 | 176 | 28 | 4 | 12 | 82 | 142 | 230 | 246 | 174 |
| 60 | 20 | 52 | 116 | 168 | 240 | 256 | 136 | 58 | 20 | 50 | 114 | 166 | 238 | 254 | 134 |
| 92 | 76 | 108 | 124 | 216 | 160 | 192 | 208 | 90 | 74 | 106 | 122 | 214 | 158 | 190 | 206 |
| 196 | 180 | 148 | 220 | 48 | 40 | 72 | 104 | 194 | 178 | 146 | 218 | 46 | 40 | 70 | 102 |
| 140 | 228 | 244 | 172 | 32 | 8 | 16 | 88 | 138 | 226 | 242 | 170 | 32 | 8 | 16 | 86 |
| 164 | 236 | 252 | 132 | 64 | 24 | 56 | 120 | 162 | 234 | 250 | 130 | 62 | 24 | 54 | 118 |
| 212 | 156 | 188 | 204 | 96 | 80 | 112 | 128 | 210 | 154 | 186 | 202 | 94 | 78 | 110 | 126 |

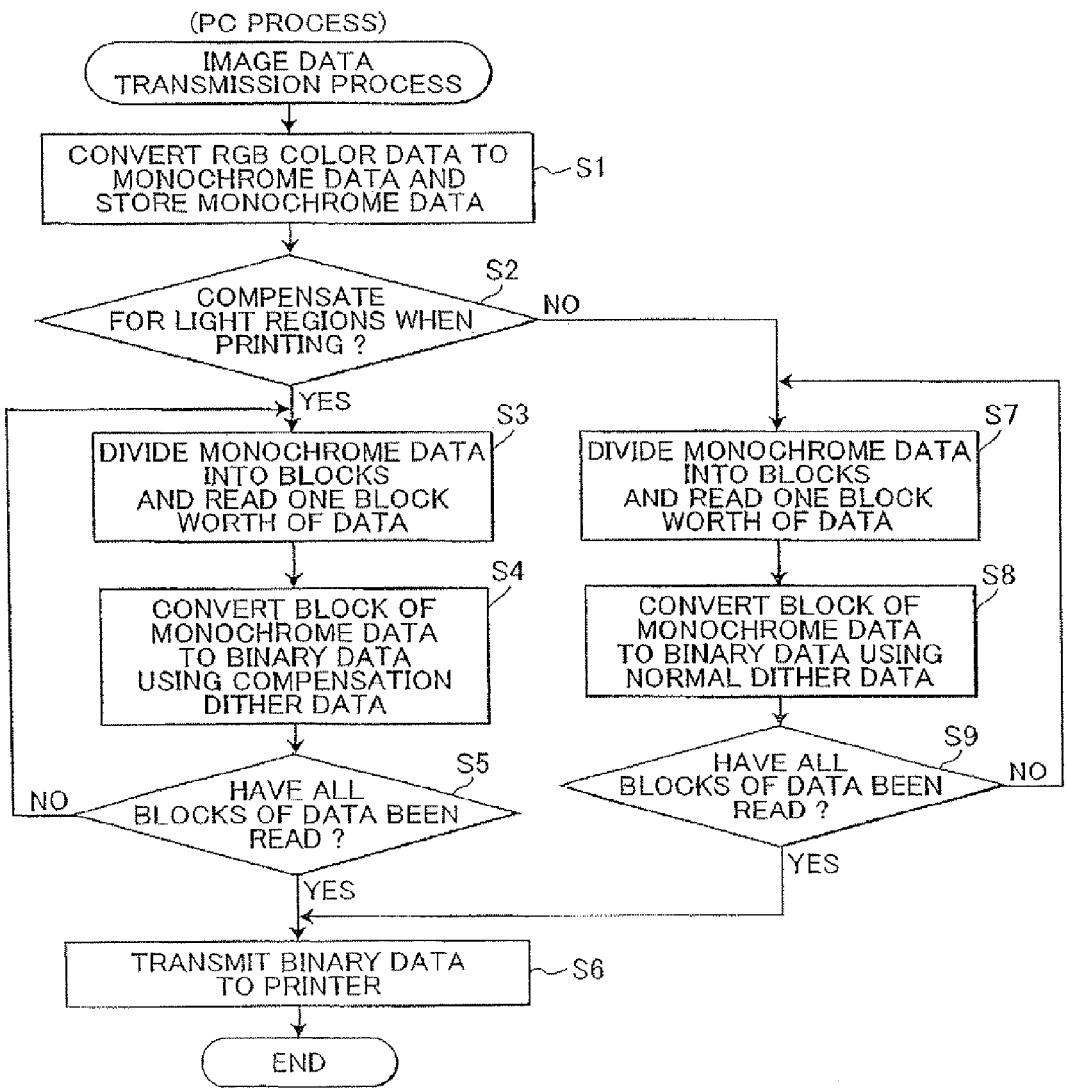

IMAGE PROCESSOR AND IMAGE PROCESSING METHOD EMPLOYING A DITHER PATTERN HAVING SUB-DITHER PATTERNS

CROSS REFERENCE TO RELATED APPLICATION

This application claims priority from Japanese Patent Application No. 2007-093585 filed Mar. 30, 2007. The entire content of each of its priority application is incorporated herein by reference.

TECHNICAL FIELD

The present invention relates to an image-processor, an image-processing method, and a computer-readable recording medium that stores an image data processing program.

BACKGROUND

An image-processing program and an image processor well known in the art employ a method for converting multi-value image data to fewer-multi-value image data having fewer tone gradations than the multi-value image data, for example, binary image data. One such image-processing method is disclosed in Japanese unexamined patent application publication No. 2002-125122. According to this image-processing method, the image-processing program and image processor employ dither data in order to convert image data to be outputted to the printer to image data having binary image data than the multi-value image data being processed.

In the dither data used in the above image-processing method, the threshold values compared to the densities of pixels belonging to each block are arranged so as to increase the uniformity of dot density. Hence, when converting multi-value image data having a relatively low density, patterns formed by dots in the image data change irregularly when the targeted multi-value image data is converted to low-level data. Consequently, the patterns in images formed by the printer also change irregularly. In other words, converting multi-value image data having a relatively low density produces noticeable irregular patterns in images formed on a printer, particularly in monochromatic images.

SUMMARY

In view of the foregoing, it is an object of the present invention to provide an image processor, an image processing method, and a computer-readable recording medium that stores an image data processing program capable of reducing the occurrence of such irregular patterns in monochromatic images formed on a monochromatic image printer.

In order to attain the above and other objects, the present invention provides an image processor including a first dither data memory storing a first dither matrix, a second dither data memory storing a second dither matrix, a selecting unit selecting one of the first dither matrix and the second dither matrix, and a converting unit converting multi-value image data to binary data by comparing density of the multi-value image data to the threshold value set in corresponding element of the one of the first dither matrix and the second dither matrix selected by the selecting unit. The second dither matrix is configured of a plurality of sub-dither matrices. Each sub-dither matrix has a plurality of elements each assigned with a threshold value in a range from a maximum threshold value to a minimum threshold value. A set of threshold values from the minimum threshold value to a predetermined intermediate threshold value is assigned to elements in corresponding locations of each of the plurality of sub-dither matrices.

According to another aspect, the present invention provides an image-processing method including:

selecting one of a first dither matrix and a second dither matrix, the second dither matrix being configured of a plurality of sub-dither matrices, each sub-dither matrix having a plurality of elements each assigned with a threshold value in a range from a maximum threshold value to a minimum threshold value, a set of threshold values from the minimum threshold value to a predetermined intermediate threshold value being assigned to elements in corresponding locations of each of the plurality of sub-dither matrices; and converting multi-value image data to binary data by comparing density of the multi-value image data to the threshold value set in corresponding element of the one of the first dither matrix and the second dither matrix selected in the selecting process.

According to another aspect, the present invention provides a computer-readable recording medium that stores an image data processing program, the data processing program comprising instructions for: selecting one of first dither matrix and second dither matrix, the second dither matrix being configured of a plurality of sub-dither matrices, each sub-dither matrix having a plurality of elements each assigned with a threshold value in a range from a maximum threshold value to a minimum threshold value, a set of threshold values from the minimum threshold value to a predetermined intermediate threshold value being assigned to elements in corresponding locations of each of the plurality of sub-dither matrices; and converting multi-value image data to binary data by comparing density of the multi-value image data to the threshold value set in corresponding element of the one of the first dither matrix and the second dither matrix selected in the selecting process.

BRIEF DESCRIPTION OF THE DRAWINGS

The particular features and advantages of the invention as well as other objects will become apparent from the following description taken in connection with the accompanying drawings, in which:

FIG. 2 is an explanatory diagram conceptually illustrating the structure of normal dither data;

FIG. 3 is an explanatory diagram conceptually illustrating the structure of compensation dither data;

FIG. 4 is a flowchart illustrating steps in an image data transmission process executed by a PC;

DETAILED DESCRIPTION

Figure 1:
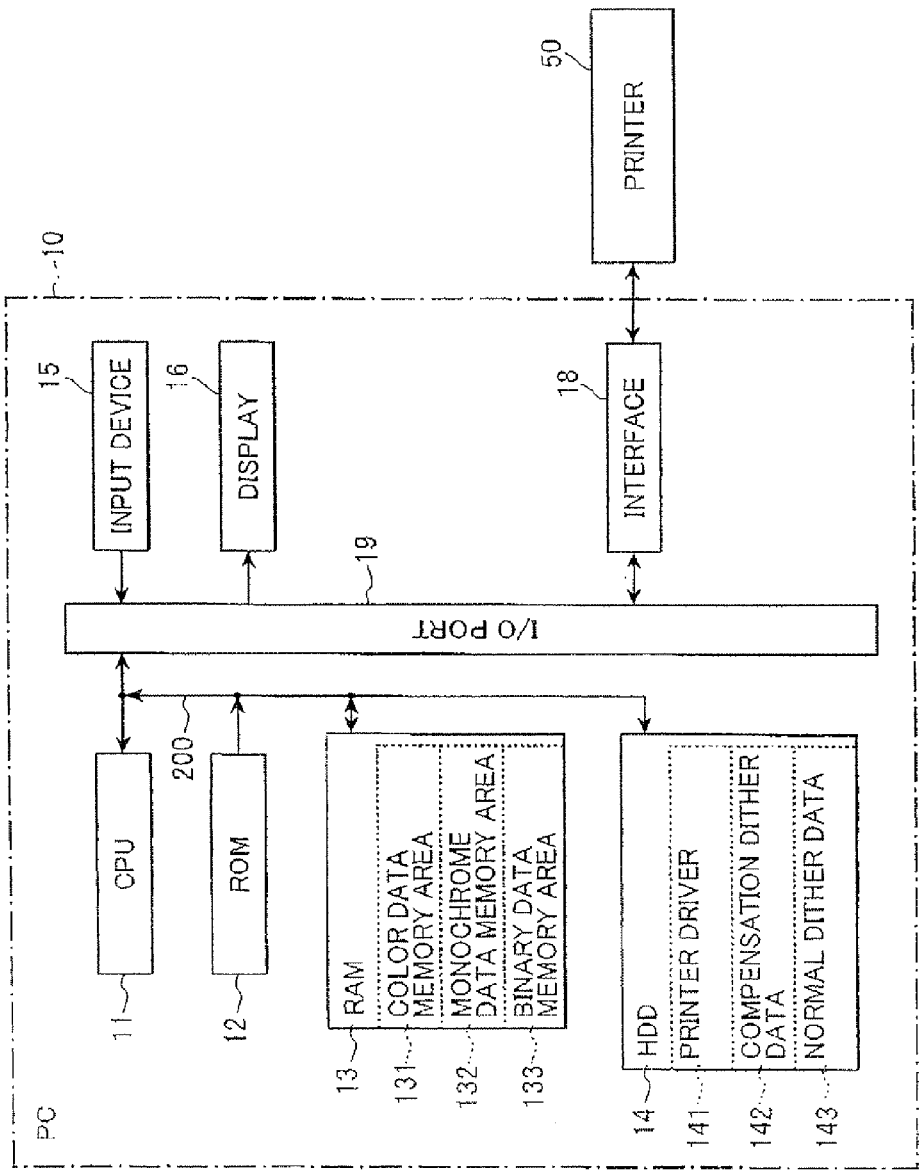
FIG. 1 is a block diagram showing the overall structure of an image-forming system including an image-processor in an embodiment of the invention.

An image-forming system including an image-processor of an embodiment of the present invention will be described while referring to the accompanying drawings. FIG. 1 is a block diagram showing the overall structure of an image-forming system including a personal computer (hereinafter abbreviated to "PC"). As shown in FIG. 1, the image-forming system 1 includes a printer 50 connected to a PC 10.

The printer 50 is a monochromatic printer that receives binary data from the PC 10 and forms monochromatic images based on the binary data. In the printer 50, image data must be binary data expressed in terms of whether a monochromatic colorant is to be deposited or not for each pixel.

The PC 10 includes a CPU 11, a ROM 12, a RAM 13, and a hard disk drive (hereinafter abbreviated to "HDD") 14, all connected via a bus line 200. The bus line 200 is also connected to an input/output port (herein after abbreviated to "I/O port") 19. The I/O port 19 is connected to an input device 15, a display 16, and an interface 18 for connecting the PC 10 to the printer 50.

The CPU 11 is a central processing unit for performing overall control of the PC 10. The CPU 11 executes control programs for implementing the processes shown in the flowcharts of FIG. 4, for example. The ROM 12 is a read-only memory for storing the control programs executed by, the CPU 11 and various data required when the CPU 11 executes these control programs.

The RAM 13 functions to temporarily store data and programs required in various processes implemented by the CPU 11. The RAM 13 is provided with a color data memory area 131, a monochrome data memory area 132, and a binary data memory area 133.

The color data memory area 131 stores image data inputted as the target of image formation when an instruction is outputted to form an image. The image data stored in the color data memory area 131 is created with an application, such as common word-processing software, spreadsheet software, or graphic design software. The image data stored in the color data memory area 131 is in the bitmap format, having tone values for each pixel expressed in 256 levels, from 1 to 256, for example, for each of the colors red (R), green (G), and blue (B). The tone values of red-colored pixels are expressed by (R, G, B)=(256, 0, 0), for example. The image data stored in the color data memory area 131 is converted to monochrome data having a monochromatic brightness for a single.

The monochrome data memory area 132 stores monochrome data produced when image data with tone values for each of the RGB colors stored in the color data memory area 131 is converted to image data having a monochromatic. The monochrome data stores a monochromatic brightness for each pixel expressed in one of 256 levels, from 1 to 256, for example.

The binary data memory area 133 stores binary data formed from the monochrome data. As mentioned, the binary data is image data expressing the brightness of each pixel as "1" or "0" in format for the printer 50. The 256-level monochrome data stored in the monochrome data memory area 132 is converted to the binary data. The PC 10 outputs the binary data stored in the binary data memory area 133 to the printer 50 via the interface 18.

The HDD 14 is a rewritable storage device and stores a printer driver 141 capable of generating print data that can be printed on the printer 50. The print data is configured of the binary data and a request command for printing. The HDD 14 also stores compensation dither data (compensation dither matrix) 142 and normal dither data (normal dither matrix) 143. The compensation and normal dither data 142 and 143 are dither data for binarizing the monochrome data to the binary data, and will be described later.

The input device 15 enables user of the PC 10 to input data or commands and is configured of a keyboard, mouse, and the like. The display 16 displays text, images, and the like allowing the user to visually confirm details of processes executed by the PC 10, inputted data, and the like. The display 16 is configured of a CRT display or a liquid crystal display, for example. The interface 18 functions to connect the PC 10 to the printer 50, and enables the PC 10 to transmit the binary data to the printer 50.

Next, the structure of the normal dither data 143 will be described with reference to FIG. 2.

The normal dither data 143 is required when color depth (occurrence rate of ON dots) in binary data is high. For example, the normal dither data is used on monochrome data converted from image data created with common graphic design software or the like.

The normal dither data 143 is configured of 16 (vertical)× 16 (horizontal) elements, for a total of 256 elements. Each of the elements in the normal dither data 143 has a threshold value set or assigned to a minimum value of 1 and a maximum value of 256.

The normal dither data 143 is also configured of tour sub-normal dither data NA, NB, NC, and ND, which data all have the same size, for a total of 64 (=8×8) elements. Small regions Na1 and Na2 are provided in the sub-normal dither data NA, small regions Nb1 and Nb2 in the sub-normal dither data NB, small regions Nc1 and Nc2 in the sub-normal dither data NC, and small regions Nd1 and Nd2 in the sub-normal dither data ND. Each small region Na1, Na2, Nb1, Nb2, Nc1, Nc2, Nd1, and Nd2 is configured of five elements, such as center element, right element, below element, left element, and above element. For example, in the small region Na1, the threshold value "1" is set in the center element, "9" in the right element, "17" in the below element, "25" in the left element, and "33" in the above element.

The position of the small region Na1 in the sub-normal dither data NA, small region Nb1 in the sub-normal dither data NB, the small region Nc1 in the sub-normal dither data NC, and the small region Nd1 in the sub-normal dither data ND are each identical, while similarly the positions of the small region Na2 in the sub-normal dither data NA, the small region Nb2 in the sub-normal dither data NB, the small region Nc2 in the sub-normal dither data NC, and the small region Nd2 in the sub-normal dither data ND are also identical.

The sub-normal dither data NA, NB, NC, and ND are configured in square shapes, and the center elements in the small regions Na1, Nb1, Nc1, and Nd1 and in the small regions Na2, Nb2, Nc2, and Nd2 are each positioned on diagonal lines within the sub-normal dither data NA, NB, NC, and ND.

Threshold values set in the small regions Na1, Na2, Nb1, Nb2, Nc1, Nc2, Nd1, and Nd2 are different from each other and increase by 1 from 1 to 40.

The threshold values from 1 to 40 are alternately set in the small regions so as to increase monotonically by 1 in the order of the small region Na1, Nd1, Nc1, Nb1, Na2, Nd2, Nc2, and Nb2 and in order of center element, right element, below element, left element, and above element in each of the small regions Na1, Na2, Nb1, Nb2, Nc1, Nc2, Nd1, and, Nd2. For example, the threshold value "1" is set in the center element of the small region Na1, and "2" in the center element of the small region Nd1. The threshold value "8" is set in the center element of the small region Nb1, and "9" in the right element of the small region Na1.

Threshold values from "41" to "256" are set in other elements outside of the small regions Na1, Na2, Nb1, Nb2, Nc1, Nc1, Nd1, and Nd2. Of these values, the threshold value "41" is set in the element just to the left of the threshold value "33" (the above element) in the small region Na1, the threshold value "42" just to the left of the threshold value "34" in the small region Nd1, the threshold value "43" just to the left of the threshold value "35" in the small region Nc1, and the threshold value "44 " just to the left of the threshold value "36" in the small region Nb1.

With this construction, when the monochrome data is converted to binary data with using the normal dither data 143, the binary data having the same size as the normal dither data 143 can express multi-level tone corresponding the number of the threshold values. In the embodiment, the binary data configured of 16×16 pixels can express 256-level tone.

Next, the structure of the compensation dither data 142 will be described with reference to FIG. 3. The compensation dither data 142 is applied to monochrome data converted from image data created by a common application, such as word-processing software or spreadsheet software, when color tone of the binary data can be relatively low.

The compensation dither data 142 is configured of 16 (vertical)×16 (horizontal) elements, for a total of 256 elements. Each of the elements in the compensation dither data 142 has a threshold value set to a minimum value of 4 and a maximum value of 256 The compensation dither data 142 has same configuration as the normal dither data 143 except for threshold values set in each of the elements.

The compensation dither data 142 is also configured of four sub-compensation dither data A, B, C, and D, which data all have the same size and are also the same size as the sub-normal dither data NA, NB, NC, and ND (see FIG. 2). Further, the arrangement of the sub-compensation dither data A, B, C, and D relative to the compensation dither data 142 is identical to the arrangement of the sub-normal dither data NA, NB, NC, and ND relative to the normal dither data 143 (see FIG. 2).

Small regions a1 and a2 are provided in the sub-compensation dither data A, small regions b1 and b2 in the sub-compensation dither data B, small regions c1 and c2 in the sub-compensation dither data C, and small regions d1 and d2 in the sub-compensation dither data D.

The small regions a1 and a2 are the same size as the small regions Na1 and Na2 in the sub-normal dither data NA. Similarly, the positions of the small regions a1 and a2 relative to the sub-normal dither data NA are the same as the positions of the small regions Na1 and Na2 relative to the sub-normal dither data NA. Similarly, each of the small regions b1, b2, c1, c2, d1, and d2 are the same size and the same positions as each of the small regions Nb1, Nb2, Nc1, Nc2, Nd1, and Nd2 in the sub-normal dither data NB, NC, and ND.

Five threshold values are set in each of the small regions a1, b1, c1, and d1, the values and arrangement of the five threshold values being the same for each of the small regions a1, b1, c1, and d1. Also, five threshold values are set in each of the small regions a2, b2, c2, and d2, the values and arrangement of the five threshold values being the same for each of the small regions a2, b2, c2, and d2.

The threshold values set in the small regions a1, b1, c1, and d1 are multiples of 4, ranging from a minimum value of 4 to a maximum value of 40. Specifically, the threshold values in each of the small regions a1, b1, c1 and d1 are alternately set so as to increase monotonically by 8 in the order of the center element, the right element, the below element, the left element, and the above element. For example, "4" is set in the center elements of the small regions a1, b1, c1, and d1, "12" in the right elements of the small regions a1, b1, c1, and d1.

Further, each of the center elements in the sub-compensation dither data A, B, C, and D is positioned on a diagonal forming a 45 degree slope relative to a side of square-shaped the sub-compensation dither data A, B, C, and D.

The five threshold values set in each of the small regions a2, b2, c2, and d2 are set by adding 4 to each of the five threshold values in the small regions a1, b1, c1, and d1. Another way to view the threshold values set in the small regions a2, b2, c2, and d2 is as even multiples of the value 8 clustered around the center threshold value of 8. In other words, the threshold values form a dot cluster of increasing values about the threshold value 8.

Threshold values from "41" to "256" are set in other elements outside of the small regions a1, a2, b1, b2, c1, c2, d1, and d2 as well as the normal dither data 143.

Next, an image data transmission process executed by the CPU 11 will be described with reference to FIG. 4. FIG. 4 is a flowchart illustrating steps in the L5 image data transmission process. Through the image data transmission process, the PC 10 converts multi-value image data to binary data receivable for the printer 50.

The CPU 11 begins the image data transmission process when image data is stored in the color data memory area 131 (see FIG. 1) and the user inputs an instruction to form an image via the input device 15 of the PC 10.

In S1 at the beginning of this process, the CPU 11 converts RGB tone values (1-256) for each pixel of the image data stored in the color data memory area 131 to a monochromatic brightness value (1-256) and stores the result in the monochrome data memory area 132 as monochrome data. For example, correlations of the RGB tone values and the monochromatic brightness values (not shown) are preset in the HDD 14, and the CPU 11 converts the RGB image data to the corresponding monochromatic brightness value according to the correlations.

In S2 the CPU 11 determines whether light regions are to be compensated for when executing the printing operation. The light regions are regions having low monochromatic brightness values on the monochrome data. In the embodiment, the low threshold values are threshold values from 1 from 40. To make this determination, the CPU 11 may prompt the user to input an instruction indicating whether to compensate for light regions and may store the input value in a flag. Subsequently, the CPU 11 may reference the flag to determine whether or not to compensate for light regions. For example, if the user determines that the image to be formed with the printer 50 may have a relatively low color depth, such as the case of image data created by common word-processing software or spreadsheet software, and inputs an instruction to execute printing with compensation for light regions, the CPU 11 sets the flag to ON. However, if the user determines that the image to be formed on the printer 50 must have a relatively high color depth, such as the case of image data created by common graphic design software, and inputs an instruction indicating not to compensate for light regions, the CPU 11 sets the flag to OFF. Accordingly, the CPU 11 determines that light region compensation printing will be executed when the flag is ON and not executed when the flag is OFF.

When the CPU 11 determines that light region compensation printing is not to be executed (S2: NO), then in S7 the CPU 11 divides the monochrome data stored in the monochrome data memory area 132 into blocks and reads monochrome data for one block. One black has same size as the normal dither data 143. In the embodiment, 256 pixels of the monochrome data belong to one black. In S8 the CPU 11 converts the monochrome data for the block read in S7 to binary data using the normal dither data 143 and stores the binary data in the binary data memory area 133. Specifically, the CPU 11 calculates an average monochrome value based on the monochrome values of the 256 pixels at one block, and determines whether dot is ON or not for each pixel comparing the average monochrome value and each threshold values of the normal dither data 143.

Next, the binary data created using the normal dither data 143 will be described with reference to FIGS. 5A through 5D.

Figure 5A:
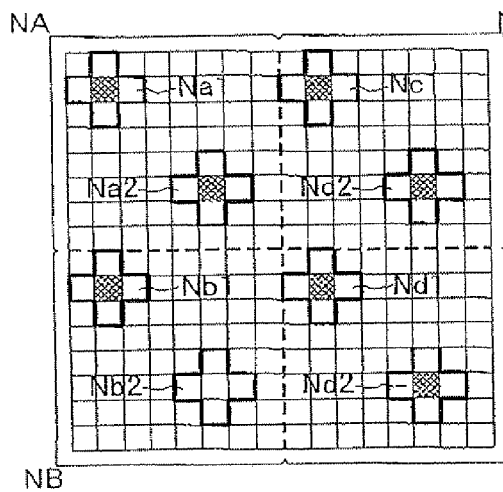
FIG. 5A is an explanatory diagram conceptually illustrating binary data created using the normal dither data when average value is 7.

As illustrated in FIG. 5A, when average brightness value of each pixel belonging to a block is 7, the center elements set the threshold values from 1 to 7 (shown in FIG. 2) in the small regions Na1, Nb1, Nc1, Nd1, Na2, Nc2, and Nd2 are set to ON in the binary image data.

Figure 5C:
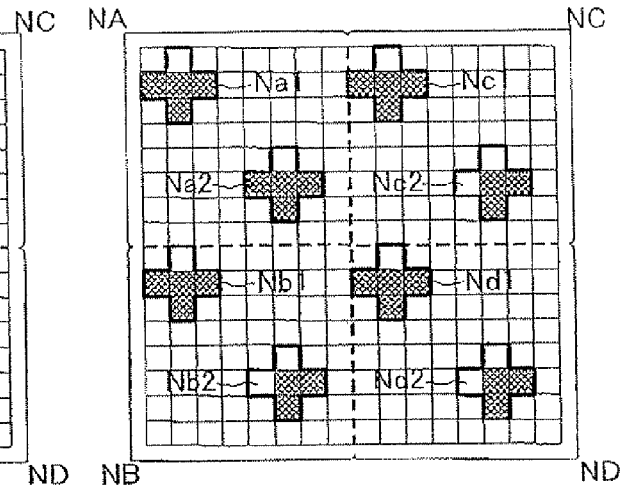
FIG. 5C is an explanatory diagram conceptually illustrating binary data created using the normal dither data when average value is 29.
Figure 5B:
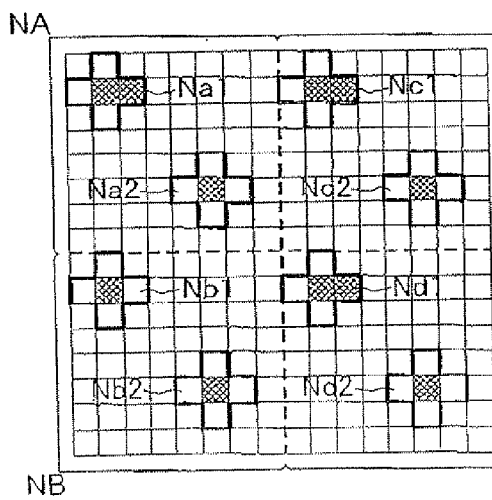
FIG. 5B is an explanatory diagram conceptually illustrating binary data created using the normal dither data when average value is 11.
Figure 5D:
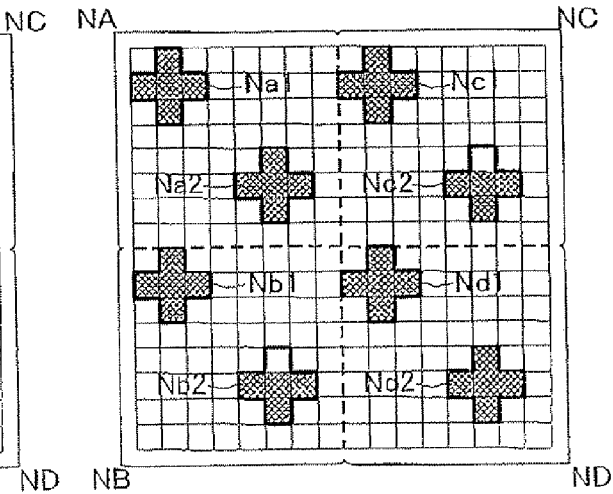
FIG. 5D is an explanatory diagram conceptually illustrating binary data created using the normal dither data when average value is 39.

Similarly, FIG. 5B shows the binary image data when the average brightness value of each pixel belonging to a block is 11, FIG. 5C when the average brightness value is 29, and FIG. 5D when the average brightness value is 39.

As shown in FIGS. 5A through 5D, the pattern configured of pixels that are ON in the small regions Na1, Nb1, Nc1, and Nd1 and the small regions Na2, Nb2, Nc2, and Nd2 in blocks of binary image data can be made to change regularly as discrete dot when the average brightness value of block change from 1 to 40.

When the average brightness value of a certain block of monochrome data changes between 1 and 40, the arrangement of ON dots in the corresponding block of binary data is discrete, and the pattern configured of these ON dots changes irregularly. Consequently, irregular patterns are produced in monochromatic images formed by the printer 50.

However, when the average brightness value of a block of monochrome data changes between 41 and 256, it is possible to discretely and monotonically change the arrangement of dots that are ON in each block of binary data formed by binarizing the monochrome data.

In S9 the CPU 11 determines whether monochrome data for all blocks of data stored in the monochrome data memory area 132 has been read. If not all blocks of monochrome data have been read (S9: NO), the CPU 11 returns to S7 and repeats the processes of S7-S9 until all blocks of monochrome data have been read.

When the CPU 11 determines that all blocks worth of monochrome data have been read (S9: YES), in S6 the CPU 11 transmits the binary data stored in the binary data memory area 133 to the printer 50 and subsequently ends the image data transmission process.

Through the process in S6, the printer 50 receives binary data from the PC 10 and forms a monochromatic image based on this data.

However, if the CPU 11 determines to execute light region compensation printing (S2: YES), then in S3 the CPU 11 divides the monochrome data stored in the monochrome data memory area 132 into blocks and reads monochrome data for one block. One black has same size as the compensation dither data. In the embodiment, 256 pixels of the monochrome data belong to one black. In S4 the CPU 11 converts the monochrome data for the block read in S3 to binary data using the compensation dither data 142 and stores the binary data in the binary data memory area 133. Specifically, the CPU 11 calculates an average monochrome value based on the monochrome values of the 256 pixels at one block, and determines whether dot is ON or not for each pixel comparing the average monochrome value and each threshold values of the compensation dither data 142.

Next, the binary data created using the compensation dither data 142 will be described with reference to FIGS. 6A through 6D.

Figure 6A:
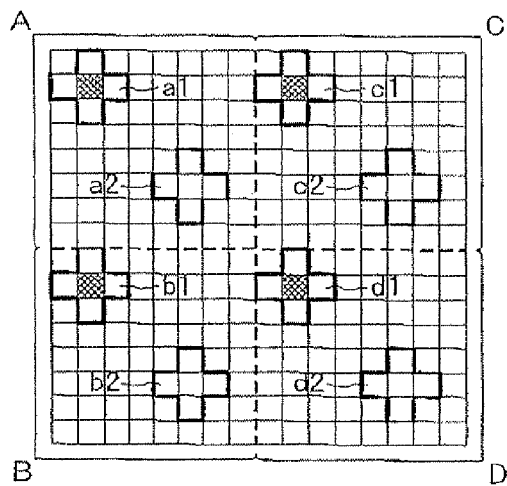
FIG. 6A is an explanatory diagram conceptually illustrating binary data created using the compensation dither data when average value is 7.
Figure 6C:
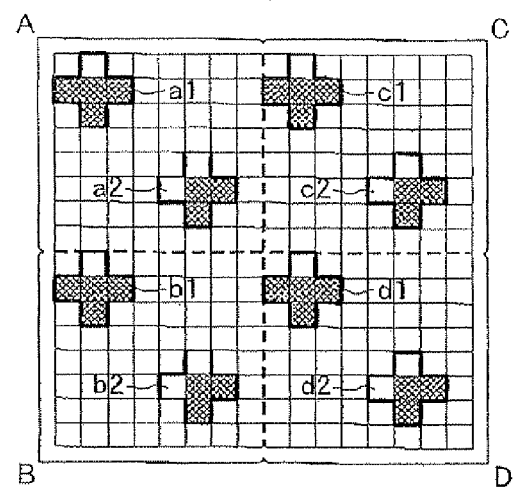
FIG. 6C is an explanatory diagram conceptually illustrating binary data created using the compensation dither data when average value is 29.
Figure 6B:
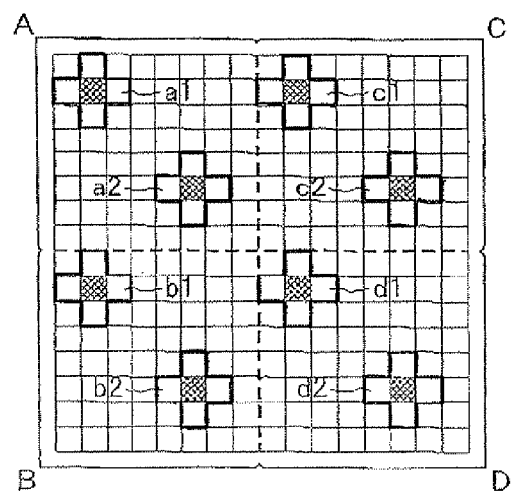
FIG. 6B is an explanatory diagram conceptually illustrating binary data created using the compensation dither data when average value is 11.
Figure 6D:
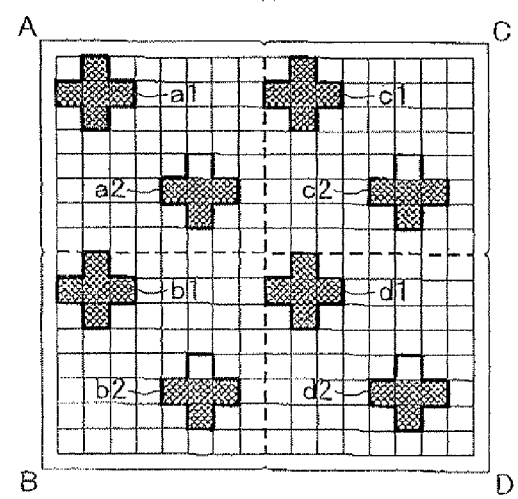
FIG. 6D is an explanatory diagram conceptually illustrating binary data created using the compensation dither data when average value is 39.

As illustrated in FIG. 6R, when the average brightness value of each pixel belonging to a block is 7, the center threshold values of the small regions a1, b1, c1, and d1 (threshold values 4 shown in FIG. 3) are set to ON in the binary data. Similarly, FIG. 6B shows the binary data when the average brightness value of each pixel belonging to a block is 11, FIG. 6C when the average brightness value is 29, and FIG. 6D when the average brightness value is 39.

As shown in FIGS. 6A through 6D, the compensation dither data 142 can create patterns regularly as dot clusters and by each dot when the average brightness value of a block of monochrome data is between 1 and 40. The pattern is configured of dots that are ON in the small regions a1, b1, c1, and d1 and the small regions a2, b2, c2, and d2 in blocks of binary data. When the PC 10 outputs the binary data to the printer 50 via the Interface 18, the printer 50 can form a monochromatic image with a pattern that expresses regularly as dot clusters and by each dot. Therefore, the PC 10 can reduce the occurrence of irregular patterns in the monochromatic images formed by the printer 50.

Further, by setting threshold values in the small regions a1, a2, b1, b2, c1, c2, d1, and d2 to multiples of 4 (see FIG. 3), the PC 10 can reduce the occurrence rate of dots that are ON as the brightness value of each pixel belonging to a block of monochrome data changes from 1 to 40, as illustrated in FIGS. 5A through 5D. That is, the PC 10 produces a lower color depth (occurrence rate of ON dots) in the binary data than when using the normal dither data 143 to convert monochrome data to binary data.

Here, the arrangement of dots constituting binary data transmitted to the printer 50 is always discrete when RGB tone values in the image data targeted for processing vary at a relatively low state. However, detailed control of the printer 50 is required to reproduce binary data transmitted to the printer 50 when the arrangement of dots constituting the binary data is discrete. Accordingly, it is generally difficult to accurately replicate binary data transmitted to the printer 50 when forming monochromatic images with the printer 50.

Accordingly, each threshold value 4 in the sub-compensation dither data A, B, C, and D is positioned on a diagonal forming a 45 degree slope relative to a side of square-shaped the sub-compensation dither data A, B, C, and D. Therefore, a pattern configured of dots that are ON in each block of binary data formed by binarizing the monochrome data is unlikely to stand out as the average brightness of pixels belonging to a block of monochrome data changes between 1 and 40.

On the other hand, it is possible to discretely and monotonically change the arrangement of dots that are ON in each block of binary data formed by binarizing the monochrome data when the brightness of each pixel belonging to a block of monochrome data changes between 41 and 256.

This prevents the arrangement of ON dots in each block of binary data produced by binarizing the monochrome data from becoming discrete when the brightness value of each pixel belonging to each block of monochrome data changes from 1 to 40. Setting the threshold values in these small regions to multiples of 4(8) reduces the occurrence rate of dots per pixel and, hence, decreases the color depth of binary data produced from the monochrome data relative to the color depth produced with the normal dither data 143.

However, when the RGB tone values of image data targeted for processing change in a relatively low state, i.e., when the brightness of each pixel belonging to a block of monochrome data changes between 1 and 40, the PC 10 reduces the occurrence rate of ON dots to reduce the color depth of binary data produced from the monochrome data. By transmitting this binary data to the printer 50, the PC 10 can reduce the amount of detailed control in the printer 507 thereby improving reproducibility of the binary data transmitted to the printer 50.

Further, the five threshold values set in each of the small regions a1, b1, c1, and d1 and their positions in dot clusters are the same for each of the small regions a1, b1, c1, and d1. Similarly, the five threshold values set in each of the small regions a2, b2, c2, and d2 and their positions in the dot clusters are the same for each of the small regions a2, b2, c2, and d2.

Therefore, using the compensation dither data 142 can avoid discrete arrangements of ON dots in the small regions a1, b1, c1, and d1 and the small regions a2, b2, c2, and d2 in each block of binary data. By transmitting such binary data to the printer 50, the PC 10 reduces the number of control steps for fine movement in the printer 50, thereby further improving reproducibility of the binary data transmitted to the printer 50.

Further, the sub-compensation dither data A, B, C, and D used are configured in square shapes, as shown in FIGS. 5A through 5D, and the threshold value at the center of dot clusters in the small regions a1, b1, c1, and d1 (threshold value 4 shown in FIG. 3) and in the small regions a2, b2, c2, and d2 (threshold value 8 shown in FIG. 3) are each positioned on diagonal lines within the sub-compensation dither data A, B, C, and D.

The threshold values outside the small regions a1, a2, b1, b2, c1, c2, d1, and d2 from 41 to 256 are set to increase monotonically by 1 while alternating between the same positions of the sub-compensation dither data A, B, C, and D in the order sub-compensation dither data A, sub-compensation dither data D, sub-compensation dither data C, and sub-compensation dither data B (see FIG. 3). Hence, while not shown in the drawings, the arrangement of ON dots in each block of binary data produced from monochrome data can be made to change discretely and monotonically when the RGB tone values of image data targeted for processing move beyond the low state, i.e., when the brightness values of pixels belonging to each group of monochrome data change between 41 and 256. Hence, tonal changes in monochromatic images formed by the printer 50 can be smoothly rendered.

In S5 the CPU 11 determines whether monochrome data for all blocks stored in the monochrome data memory area 132 has been read. If not all blocks of monochrome data have been read (S5: NO), the CPU 11 returns to S3 and repeats the process in S3-S5 until monochrome data has been read for all blocks.

When the CPU 11 determines that all blocks worth of monochrome data have been read (S5: YES), in S6 the CPU 11 transmits the binary data stored in the binary data memory area 133 to the printer 50 and subsequently ends the image data transmission process.

Through the process in S6, the printer 50 receives binary data from the PC 10 and forms a monochromatic image based on this data.

Through the image data transmission process described above, the CPU 11 can convert image data stored in the color data memory area 131 to monochrome data configured of brightness values, convert the monochrome data to binary data using one of the compensation dither data 142 and normal dither data 143, and transmit the binary data to the printer 50.

Therefore, the pattern configured of dots set to ON in a block of binary data created by binarizing the monochrome data can be made to change regularly when the brightness of each pixel belonging to the block of monochrome data changes from 1 to 40.

While the invention has been described in detail with reference to the embodiment thereof, it would be apparent to those skilled in the art that various changes and modifications may be made therein without departing from the spirit of the invention.

For example, the threshold values set in the small regions a1, a2, b1, b2, c1, c2, d1, and d2 are arranged from 4 to 40 in order that the pattern of ON dots changes uniformly. However, the range of threshold values in the small regions a1, a2, b1, b2, c1, c2, d1, and d2 may be set from 1 to 64, where the threshold value 64 corresponds to one-fourth the 256 levels of monochromatic brightness (1-256).

Further, in S1 of the image data transmission process according to the embodiment described above, the CPU 11 converts RGB tone values (1-256) for each pixel in image data stored in the color data memory area 131 to a monochromatic brightness (1-256). However, the CPU 11 may instead convert the RGB tone values for each pixel in the image data to a simple brightness or a simple saturation.

Further, in S4 and S8 of the image data transmission process, the CPU 11 may compare the brightness of each of pixels belonging to a block to the threshold values corresponding these pixels. Each block obtained by dividing the monochrome data is very small relative to the overall size of the monochrome data. Therefore, there is little change in the brightness within each block.

With above configuration, by dividing the monochrome data into blocks and comparing the average brightness value of the block to the five threshold values in the small regions a1, b1, c1, and d1, the same results will be obtained for each of the small regions a1, b1, c1, and d1. For example, when the center and right elements in the small regional are on, the center and right elements in the small regions b1, c1, and d1 are on. Similarly, the same results will be obtained for each of the small regions a2, b2, c2, and d2.

Further, the values of the five thresholds set in each of the small regions a1, b1, c1, and d1 and their arrangement is identical for each small region. Hence, it is very likely that the same results will be obtained for each of the small regions a1, b1, c1, and d1 when comparing the brightness of each pixel belonging to a block of monochrome data to the five threshold values corresponding to each pixel in each of the small regions a1, b1, c1, and d1. This reason also applies to the small regions a1, b2, c2, and d2.

Accordingly, while there may be some variation in how the brightness of each pixel belonging to a certain block changes, this variation is limited. Therefore, the CPU 11 can acquire high-precise conversion of the monochrome data to the binary data.

Further, in S4 and S8 of the image data transmission process, the CPU 11 may compare a lightness value of a block to the threshold values corresponding these pixels.

Further, in S4 and S8 of the image data transmission process, the CPU 11 may compare a chroma value of a block to the threshold values corresponding these pixels.

While the example in FIG. 1 shows a single PC 10 connected directly to the printer 50, the image-forming system may be configured of a plurality of PCs 10 sharing a single printer 50 via a network. Here, the interface may be any format, such as USB, Ethernet (registered trademark), or wireless LAN.

What is claimed is:

1. An image processor comprising:
   a first dither data memory storing a first dither matrix;
   a second dither data memory storing a second dither matrix, the second dither matrix being configured of a plurality of sub-dither matrices, each sub-dither matrix having a plurality of elements each assigned with a threshold value falling in a range from a maximum threshold value to a minimum threshold value, each threshold value smaller than or equal to a predetermined intermediate threshold value being assigned in at least two corresponding sub-dither matrices of the plurality of sub-matrices, each threshold value greater than the predetermined intermediate threshold value being assigned in only one corresponding sub-dither matrix of the plurality of sub-dither matrices;
   a selecting unit selecting one of the first dither matrix and the second dither matrix; and
   a converting unit converting multi-value image data to binary data by comparing density of the multi-value image data to the threshold value set in corresponding element of the one of the first dither matrix and the second dither matrix selected by the selecting unit.

2. The image processor according to claim 1, wherein the threshold values from the minimum threshold value to the predetermined intermediate threshold value increase monotonically by at least two and are assigned to different elements in the sub-dither matrix.

3. The image processor according to claim 1, wherein the sub-dither matrix comprises a first dot-concentrated dither matrix configured of a center element and a predetermined number of neighboring elements disposed adjacent the center element wherein the minimum threshold value is assigned to the center element.

4. The image processor according to claim 3, wherein the threshold values increasing from the minimum threshold value to the predetermined intermediate threshold value are assigned to the predetermined number of neighboring elements.

5. The image processor according to claim 4, wherein the sub-dither matrix has square-shaped, and the element to which the minimum threshold value is assigned is positioned diagonally in the square-shaped sub-dither matrix.

6. The image processor according to claim 3, wherein the sub-dither matrix farther comprises a second dot-concentrated dither matrix configured of elements corresponding to the elements of the first dot-concentrated dither matrix, wherein the elements of the second dote concentrated dither matrix having threshold values greater by at least two than the threshold values assigned to the corresponding elements of the first dot-concentrated dither matrix.

7. The image processor according to claim 1, wherein the predetermined intermediate threshold value is a quarter of the maximum threshold value.

8. The image processor according to claim 1, wherein the threshold values between the predetermined value and the maximum threshold value increase monotonically.

9. The image processor according to claim 1, wherein the density is brightness value.

10. The image processor according to claim 1, wherein the density is lightness value.

11. The image processor according to claim 1, wherein the density is chroma value.

12. The image processor according to claim 1, further comprising a transmitting unit transmitting the binary data converted by the converting unit to an image-forming device that forms monochromatic images based on the binary data.

13. An image-processing method for halftoning an image containing multi-value data received by an image processing device, the method comprising:
   selecting one of a first dither matrix and a second dither matrix, the second dither matrix being configured of a plurality of sub-dither matrices, each sub-dither matrix having a plurality of elements each assigned with a threshold value falling in a range from a maximum threshold value to a minimum threshold value, each threshold value smaller than or equal to a predetermined intermediate threshold value being assigned in at least two corresponding sub-dither matrices of the plurality of sub-matrices, each threshold value greater than the predetermined intermediate threshold value being assigned in only one corresponding sub-dither matrix of the plurality of sub-dither matrices; and
   converting multi-value image data to binary data by comparing density of the multi-value image data to the threshold value set in corresponding element of the one of the first dither matrix and the second dither matrix selected in the selecting process.

14. A non-transitory computer-readable recording medium that stores an image data processing program executable by a processor, the data processing program instructing the processor to perform the steps comprising:
   selecting one of first dither matrix and second dither matrix, the second dither matrix being configured of a plurality of sub-dither matrices, each sub-dither matrix having a plurality of elements each assigned with a threshold value falling in a range from a maximum threshold value to a minimum threshold value, each threshold value smaller than or equal to a predetermined intermediate threshold value being assigned in at least two corresponding sub-dither matrices of the plurality of sub-matrices, each threshold value greater than the predetermined intermediate threshold value being assigned in only one corresponding sub-dither matrix of the plurality of sub-dither matrices; and
   converting multi-value image data to binary data by comparing density of the multi-value image data to the threshold value set in corresponding element of the one of the first dither matrix and the second dither matrix selected in the selecting process.

* * * * *